United States Patent
Ho

[11] Patent Number: 5,864,417
[45] Date of Patent: Jan. 26, 1999

[54] LASER AUDIO-VISUAL EQUIPMENT

[76] Inventor: Ko-Liang Ho, No. 305, Hua Cheng Rd., Hsinchuang, Taipei Hsien, Taiwan

[21] Appl. No.: 882,157

[22] Filed: Jun. 25, 1997

[51] Int. Cl.[6] .............................. G02B 26/08; G02B 5/08
[52] U.S. Cl. .......................... 359/201; 359/223; 359/857
[58] Field of Search .................................... 359/223, 224, 359/225, 226, 838, 871, 872, 201, 857, 862

[56] References Cited

U.S. PATENT DOCUMENTS

| | | | |
|---|---|---|---|
| 4,006,970 | 2/1977 | Slater et al. | 359/223 |
| 4,871,904 | 10/1989 | Metlitsky et al. | 235/467 |
| 5,293,265 | 3/1994 | Aleshin et al. | 359/198 |
| 5,600,478 | 2/1997 | Stevens | 359/223 |

*Primary Examiner*—Cassandra C. Spyrou
*Assistant Examiner*—Mark A. Robinson
*Attorney, Agent, or Firm*—Rosenberg, Klein & Bilker

[57] ABSTRACT

A laser audio-visual unit is provided that includes a laser pattern displaying device having a full-image spectral device therein. The laser pattern displaying device is operated in different control modes, such as automatic, manual or sound control modes, to project various laser patterns to be displayed onto a wall or screen or other objects. The displaying device includes a housing, a fixed plate, a fixed rack and a mounting stand. The full-image spectral device includes a first reflecting mirror connected to a first rotating motor, serving to reflect light rays. On the first rotating motor there is provided a biasing device to provide for adjustment, by way of the varying rpm of the first rotating motor, of an inclination angle of the first reflecting mirror. In addition, there is a second reflecting mirror connected to the second rotating motor, used to reflect the light rays reflected from the first reflecting mirror, and to adjust, by way of the varying rpm of the second rotating motor, the inclination angle of the second reflecting mirror. Further, one or more full-image plates are provided to cause diffraction of the light rays reflected from the second reflecting mirror, to increase the spatial variation of scanned patterns and visual effects. The laser beam projected from the laser head impinges upon the reflecting disc of the operating first motor, and is reflected to the reflecting disc of the operating second motor, and then projected to a wall or other fixture to display various laser patterns that are fixed or repeated again and again.

5 Claims, 11 Drawing Sheets

(11)

(15)

(12)

(16)

(13)

(17)

(14)

(a)

(c)

(b)

(d)

(e)

LASER AUDIO-VISUAL EQUIPMENT

BACKGROUND

1. Field of the Invention

The subject invention relates to a type of laser audio-visual equipment, particularly to one which is applicable to two-axle motor rotary mirror reflection system, to upgrade the variation of scanned patterns and visual effects, and to make improvement on such disadvantages of prior arts which patterns could only be projected onto a specified spot and which monotonous variation could not satisfy visual enjoyment.

2. Prior Art

In conventional technology, the two-axle motor rotary mirror reflection system is widely used in bar-code readers, as in the cases of U.S. Pat. No. US515181 and European patent No. UP0412544. A two-axle motor rotary mirror reflection system includes two sets of reflective mirror, each connected to the rotary motor to drive the rotation of the reflective mirror. Meanwhile, each rotary motor is connected to a control circuit to control the rotation of the motor. The light rays coming from the laser light source are reflected through one of its reflective mirrors to become reflected light, then the light rays continue to move forward, then they are reflected at the second reflecting mirror, and finally they become scanned patterns and are projected onto the screen. Such scanned patterns produced from the controlling the motor rotation and the angle of the reflecting mirror are similar to Lissajou pattern, and they would vary with the motor rotation and the angle of the reflecting mirror, and the patterns will vary accordingly. Only trouble is, the variation of such patterns is quite limited and stereotyped.

Referring to FIG. 1 which is the structural view of a prior art of a two-axle motor rotary mirror reflection system. First, a light projecting source 10 is provided, such as a light bulb or a laser source. The light rays projected from the light projecting source 10 are reflected at the first reflecting mirror 11a to produce reflected light, the first reflecting mirror 11a being connected to the first rotating motor 12a, the first rotating motor 12a being electrically connected to the control circuit 13a which serves to control the rotation of the first rotating motor 12a and to drive the first reflecting mirror 11a to rotate. The light rays reflecting from the first reflecting mirror 11a continues to move forward and are reflected at the second reflecting mirror 11b, the second reflecting mirror 11b being connected to the second rotating motor 12b, and the second rotating motor 12b being electrically connected to the control circuit 13b which serves to control the rotation of the second rotating motor 12b, and to drive the second reflecting mirror 11b to rotate. Said device, including the first rotating motor 12a, the first reflecting mirror 11a, the second rotating motor 12b and the second reflecting mirror 11b, constitutes the so-called two-axle motor rotating mirror reflection system, whereby, controlling of the motor rotation and the angle of the reflecting mirror will produce varied scanned patterns similar to Lissajou patterns, such as pattern 15 being projected on the screen 16. Generally, such scanned patterns can only be projected on a specified spot, and its variation is repeated in cycles, so it could not really satisfy our visual enjoyment.

On the other hand, such prior art of two-axle motor rotating mirror reflection system was designed for applications to household or KTV's audio-video recreational purposes. But, such scanned patterns could only have monotonous variations which are repeated again and again, they could not satisfy the visual enjoyment in households or audio-video recreational locations. Therefore, a sound function to control motor rotation has been introduced, in which, as long as there is the existence of sounds, such as music or hand-clapping sounds, it will be able to change motor rotation to enable more variations of the scanned patterns. Though such a method will increase the variations of scanned patterns, such increase is still limited, since the scanned patterns are still repeated and projected onto a specified spot, and it still fails to satisfy the spatial and visual enjoyment that are anticipated in households and audio-video recreational locations.

SUMMARY OF THE INVENTION

The main purpose of the subject invention is to provide a type of laser audio-visual unit that can be included in the pattern scanning and producing systems, by means of the spectral characteristics of diffraction grating on the full-image plate, a single scanned pattern can be diffracted and distributed in the space, with the addition of simple balancing devices, to control motor rotation to adjust the angle of reflecting mirror, thus increasing the variations of scanned patterns and the visual effects. To achieve the above purpose, the subject invention presents a laser audio-visual unit, comprising a laser figure display device and a full image spectral device. The aim of the subject invention is to provide a type of laser audio-visual device whereby automatic, manual, sound-control, or other different operations are possible to display "laser figures" on the wall or screens, thus enabling widely-varied patterns for such occasions on performing stages, parties or advertisements.

From one aspect, the present invention is directed to a full-image spectral device, including:

The first reflecting mirror, fitted on the first rotating motor, to reflect light rays, with a balancing device fitted on the first rotating motor, by way of such balancing device, the varying rpm of the first rotating motor will adjust the inclining angle of the first reflecting mirror. Besides, there is a second reflecting mirror connected to the second rotating motor, to reflect the light rays that are reflected from the first reflecting mirror, and on the second rotating motor is a balancing device whereby the varying rpm of the second rotating motor will adjust the inclining angle of the second reflecting mirror. Also, there is one or more full-image plates adjoining the second reflecting mirror, to diffract the light rays reflected from the second reflecting mirror, to increase the patterns' spatial variations and visual effects.

To enable better understanding of the subject invention, other purposes, features and advantages, the following example of preferred embodiment, along with drawings, are described in details below:

DETAILED DESCRIPTION OF THE PREFERRED EMBODIMENTS

Figure 1:
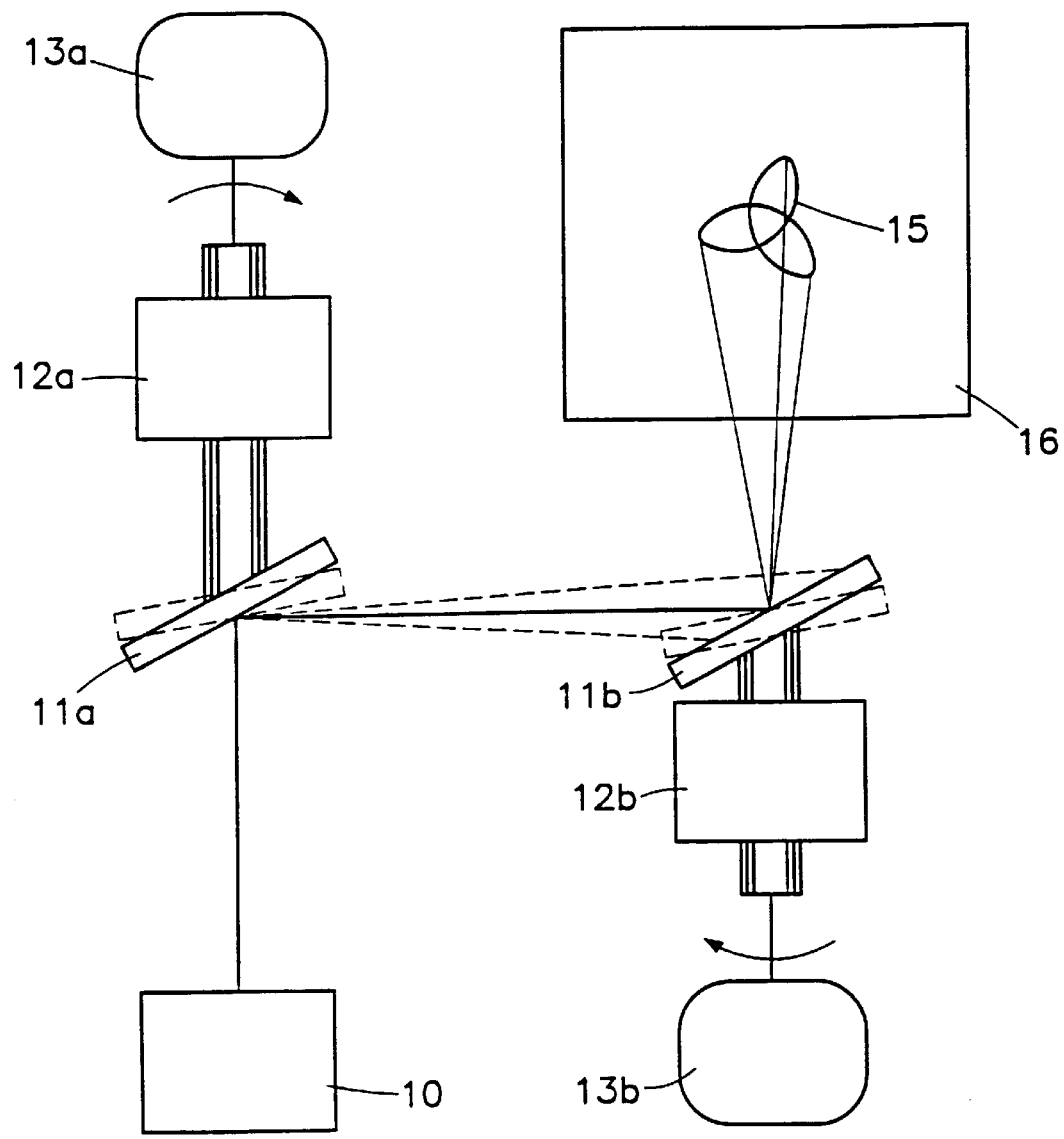
FIG. 1 is the structural view of a prior art of a two-axle motor rotating mirror reflection system.
Figure 2:
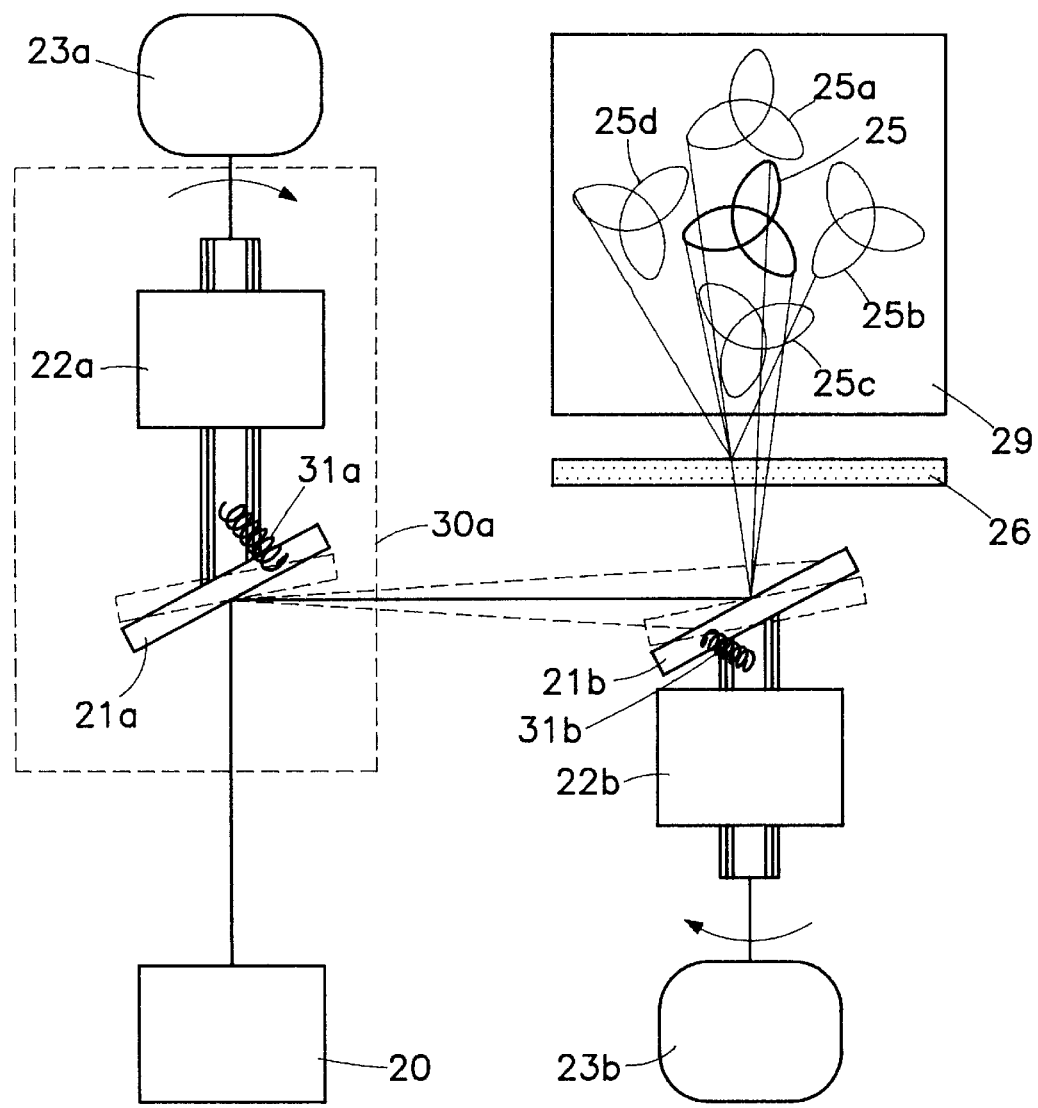
FIG. 2 is the structural view of a full-image spectral device in the subject invention.

Referring to FIG. 2 there is shown a structural view of a full-image spectral device of the subject invention. First, a light projecting source (20) is provided, such as a light bulb or a laser light source. The light rays projected from the light projecting source 20 will produce reflected light at the first reflecting mirror 21a, the first reflecting mirror 21a being connected to the first rotating motor 22a, and the first rotating motor 22a being electrically connected to the control circuit 23a which serves to control the rpm of the first rotating motor 22a, and drive the first reflecting mirror 21a to rotate. The light rays reflected from the first reflecting mirror 21a continues forward to be reflected at the second reflecting mirror 21b, the second reflecting mirror being connected to the second rotating motor 22b, and the revolution of the second rotating motor 22b drives the second reflecting mirror 21b to rotate. The above device, including the first rotating motor 22a, the first reflecting mirror 21a, the second rotating motor 22b and the second reflecting mirror 21b, constitutes the so-called two-axle motor rotating mirror reflection system. By controlling the motor rotation and the angle of reflecting mirrors, we can produce various scanned patterns similar to Lissajou figures, as Pattern 25, then projected onto the screen 29.

Generally, such scanned patterns similar to Lissajou figures will include a function of voice-controlled motor revolution to increase the variations of patterns. With the existence of sounds in the environment, such as music or hand-clapping sounds, we can change the motor rpm and enable more variations of scanned patterns. However, since such scanned patterns 25 can only be projected onto a specified spot on the screen 29, and only monotonous variations can be repeated, it could not really satisfy our visual enjoyment. Therefore, the subject invention has added at least a fall-image plate 26 into the two-axle motor rotating mirrors reflecting system, located in front of the second reflecting mirror 21b where the light rays are reflected, which serves to enable diffraction of the light rays reflected from the second reflecting mirror 21b. The fall-image plate 26 has a diffraction grating, and the fall-image plate 26 can be made of a plastic material that is die compressed or die extruded, or a glass material that is gilded. In case the light source 20 is powerful enough, the light rays can be made into several steps of diffraction, such as zero-step diffracted pattern 25 and one-step diffracted patterns 25a to 25d, thus to increase the variations of the scanned pattern 25. Besides, the subject invention has also provided a biasing device 30, as in FIG. 3, to be installed between the first rotating motor 22a and the first reflecting mirror 21a, or between the second rotating motor 22b, and the second reflecting mirror 21b. That is, to an elastic device such as a spring 31a is installed between the first rotating motor 22a, and the first reflecting mirror 21a, or an elastic device such as spring 31b is installed between the second rotating motor 22b and the second reflecting mirror 21b. By that arrangement, number of pattern variations are increased.

Figure 3:
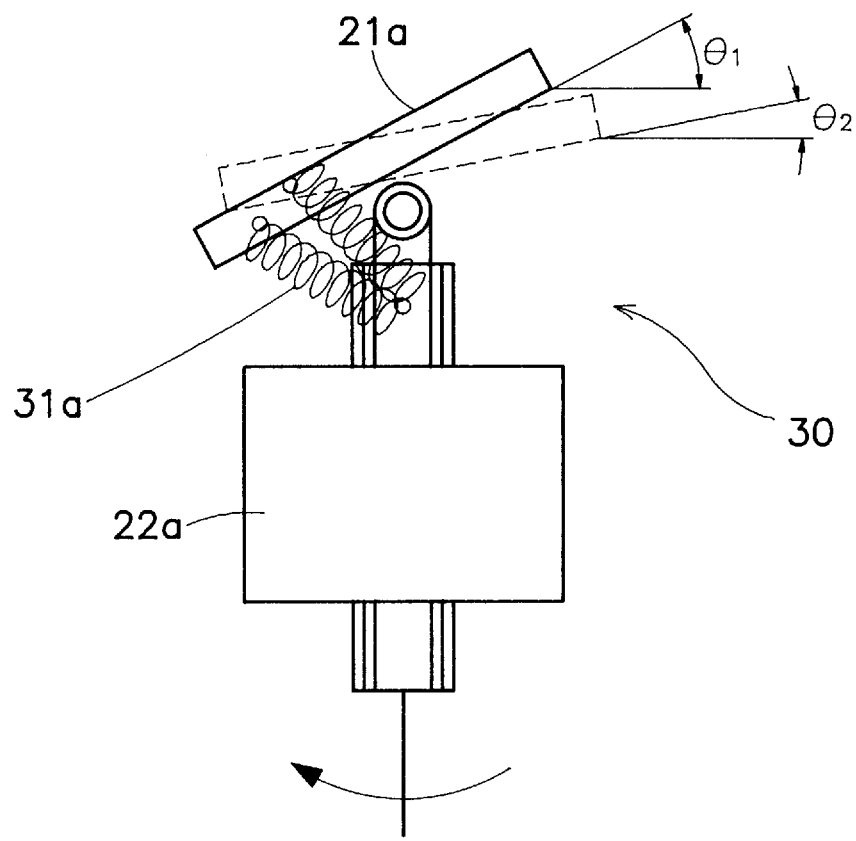
FIG. 3 is the enlarged view of the dotted area in FIG. 2.

Referring to FIG. 3 which is the enlarged view of the dotted area 30 in FIG. 2. The biasing device 30 is associated the rotating motor 22a, the rotating motor being connected the reflecting mirror 21a. And, between the reflecting mirror 21a and the rotating motor 22a is the connecting spring 31a, which is aimed to increase the number of variations of the scanned pattern 25 and scanned patters from 25a to 25d. As result of the tension of spring 31a and the inclining angle of the reflecting mirror 21a is $\theta_1$, when there is a change of rpm of the rotating motor 22a, the change of centrifugal force will shorten or lengthen the spring 31a, to change the inclining angle of the reflecting mirror 21a to $\theta_2$. Therefore, the inclining angle of the reflecting mirror 21a is changed simultaneously when the rpm of the rotating motor 22a is changed, thus increasing the variations of the scanned pattern 25 and the scanned patters 25a to 25d.

Figure 4:
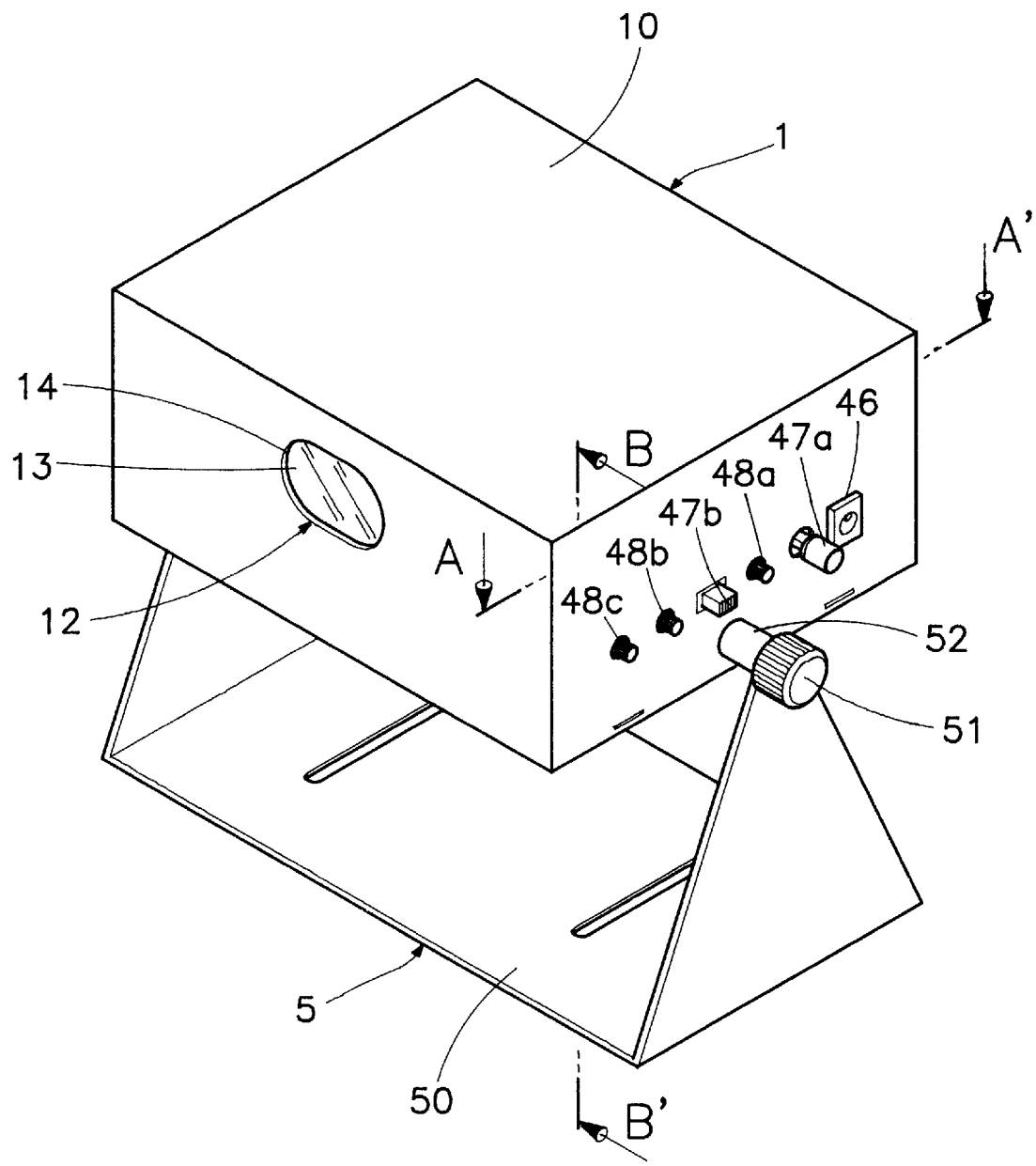
FIG. 4 is the perspective view of the subject invention.
Figure 5:
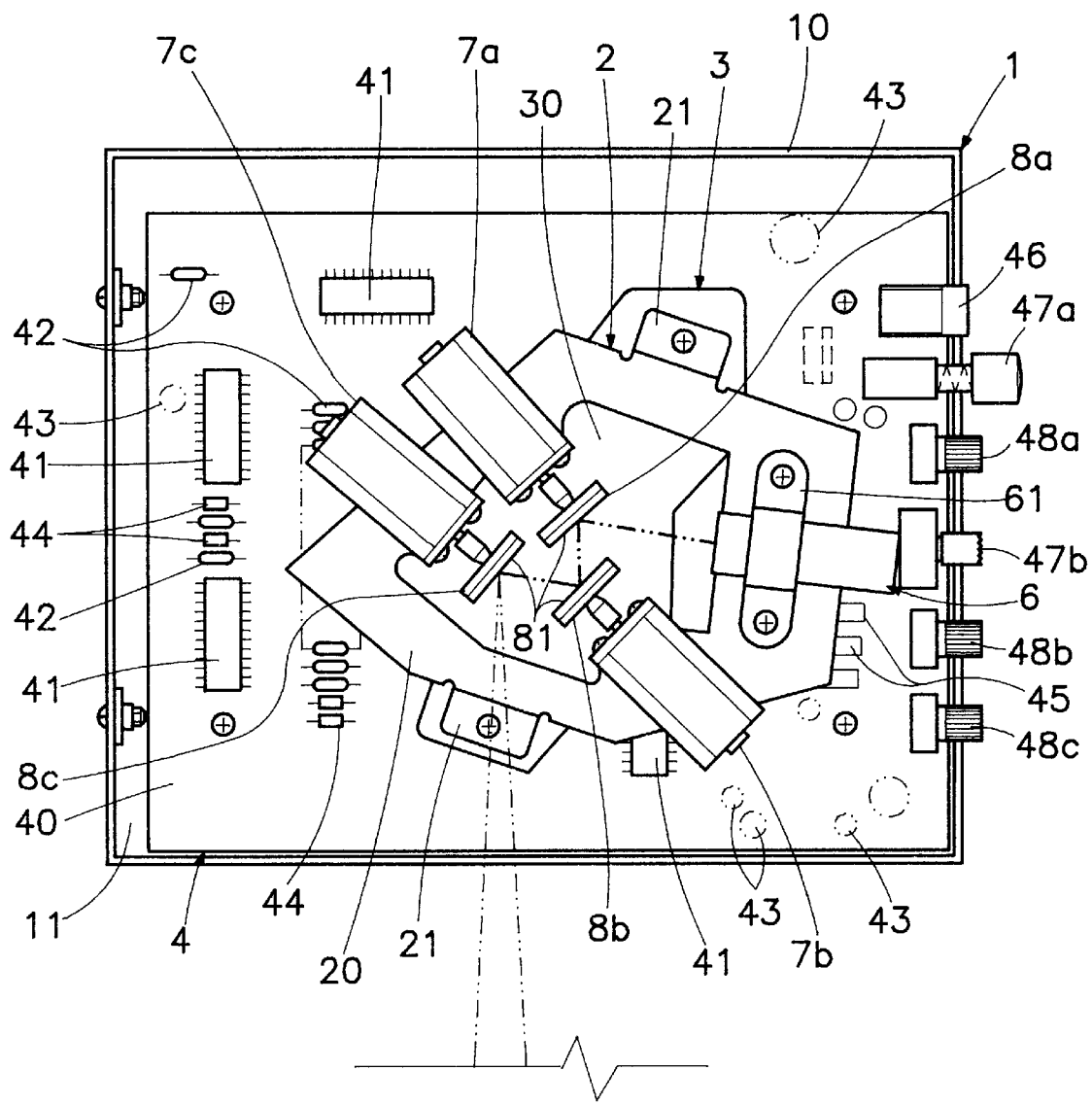
FIG. 5 is the section view with crossing line A–A' in FIG. 4.
Figure 6:
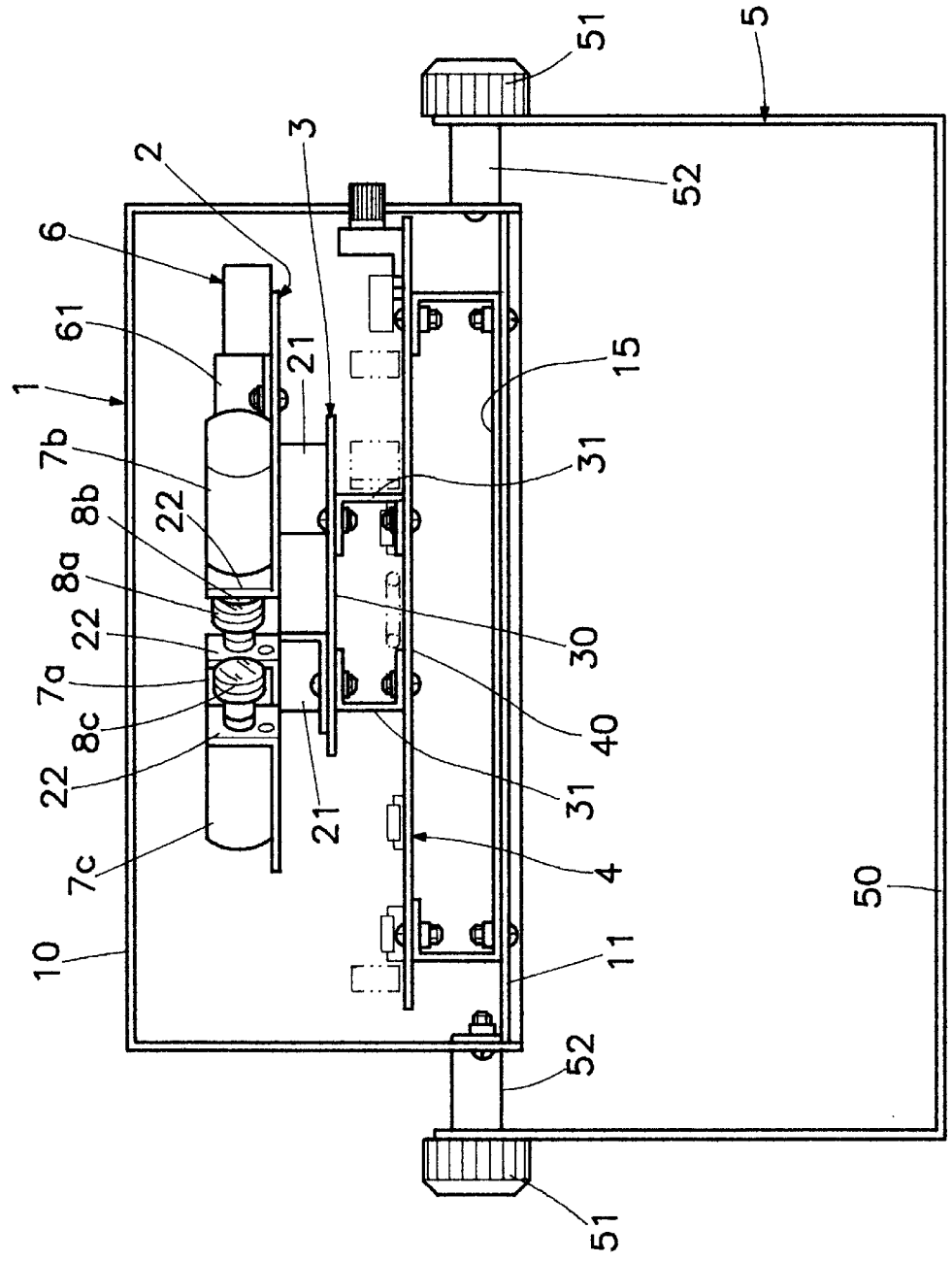
FIG. 6 is the section view with crossing line B–B' in FIG. 4.

Referring to FIGS. 4, 5 and 6 which are the laser patterns displaying device of the subject invention of laser AV equipment, comprising mainly: a housing 1, a fixed plate 2, a fixed rack 3, a printed circuit board 4, a mounting stand 5, a laser head 6, two or more motors 7a, 7b, 7c and two or more reflecting discs 8a, 8b, 8c, etc.

As in FIG. 5, said housing 1 is composed of a box hood 10 and a bottom plate 11 nailed thereto; Said bottom plate 11 is mainly for the fixation of most components of the subject invention; On the front side of the box hood 10 is a window hole 13 and a lens 14 serving as the lens 12 (as in FIG. 4) to project laser patterns in the subject invention; Said box hood 10 is mainly for covering all the components fixed on said bottom plate 11.

As shown in FIG. 5, said fixed plate 2 is a frame plate 20 preferably in a polygon, below which are one or more fixing legs 21 to be fixed onto the fixed rack 3 then locked onto the printed circuit board 4; On said frame plate 20 are two or more vertical racks 22 for the fixing of motors 7a, 7b and 7c.

With an unspecified shape of plate body 30, said fixed rack 3 comprises a plate body 30 below which are two or more fixing legs, and serves mainly as a locking device on the printed circuit board 4 to lock the fixed plate 2 (as in FIG. 6).

Said printed circuit board 4 includes a printed circuit (not shown in Figure) on the plate body 40, on which are electronic components such as several IC 41, several resistors 42, several capacitors 43, several diodes 44 and several transistors 45, etc. (as shown in FIG. 5), to compose such integrated (or complex) circuits as for motor drive, two-way rotation rpm control circuit, manual/automatic control circuits and sound-control circuits, etc. (application for which patent rights shall be filed separately, so they are not elaborated herein), to control the subject invention and to enable optional automatic, manual or sound-control operations; And, on one side of the plate body of the printed circuit board 4 are installed with such electrical components as: power converter socket 46, power switch 47a, mode switch 47b, changing patterns delay time knob 48a, the first manual changing pattern knob 48b and the second manual changing pattern knob 48c, etc. (as shown in FIGS. 4 and 5), which are used to control and operate the subject invention. This printed circuit board body 40 is locked by one or more pairs of channel shaped rack 15 onto said bottom plate 11 (as shown in FIG. 6).

Figure 7:
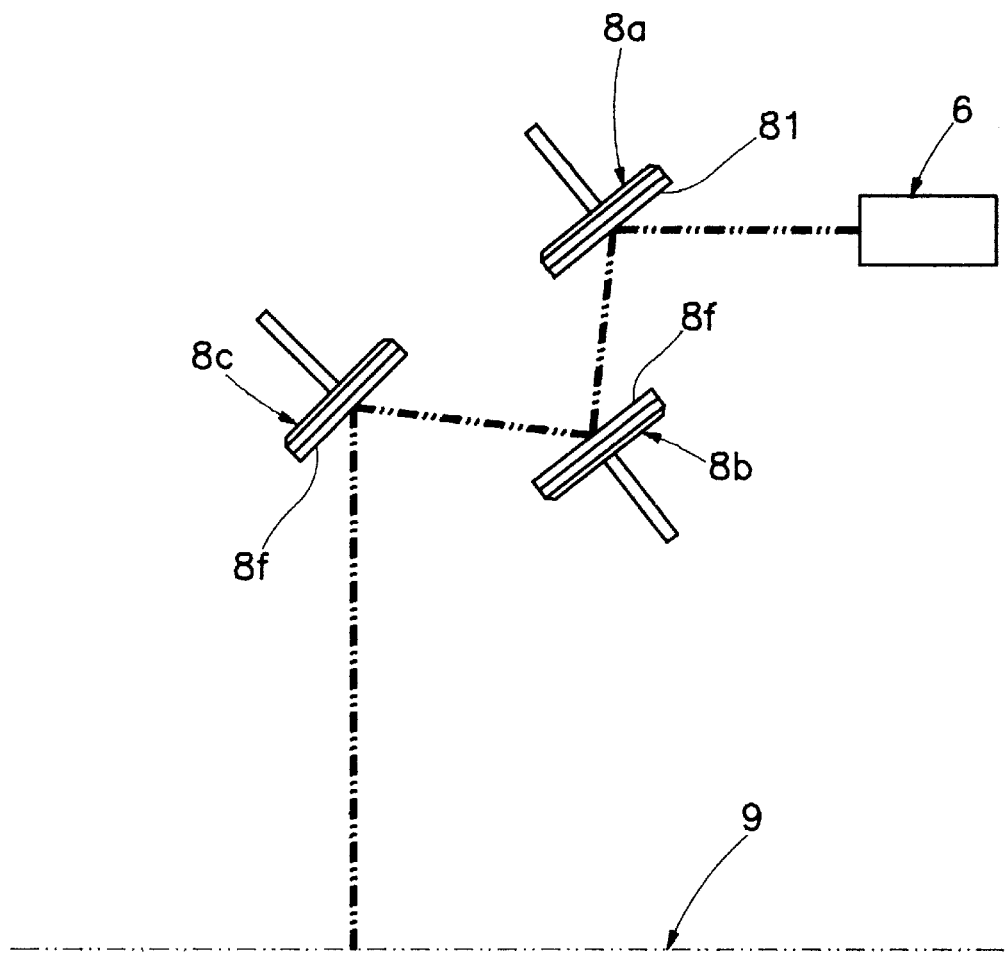
FIG. 7 is the view of the subject invention, transforming laser ray "dots" into "laser patterns (images).

Said laser head 6 is, as shown in FIG. 5, fixed by a clamping plate 61 onto the reflecting turning discs 8a, 8b, 8c, and on each reflecting turning disc is installed with a reflecting mirror 81 respectively, so that the "dot" laser rays projected from said laser head 6, when projected onto the first reflecting turning disc 8a, will be reflected onto the second reflecting turning disc 8b, then again reflected onto the third reflecting turning disc 8c, and the laser patterns reflecting from the third reflecting turning disc 8c is projected from the lens 12 on the housing 1 straight ahead onto the wall 9, or other screens, with a distance of no less than 30 centimeters (as shown in FIG. 7).

The mounting stand 5, as shown in FIGS. 4 and 6, is a U-shaped frame body 50, on both sides of its upper part are respectively a knurled or threaded nut 51 tightening a bolt 52; and on the insides of the two bolts 52 are respectively joined to the two sides of the box hood 10 on the housing 1 by rivets; The purpose of this mounting stand 5 is mainly to facilitate the installation of the subject invention. With said mounting stand, the subject invention can be fixed onto a machine frame (not shown in the Figure) or at one side of a performing stage, or any other fixtures; As shown in FIG. 4, the lens 12 on the box hood 10 of the housing 1 can be aligned to a horizontal direction straight ahead for the projecting of laser patterns. Or, the two nuts 51 at both sides of the mounting stand 5 can be loosened to adjust the housing 1 for slightly upward or downward inclination before the two nuts 51 are tightened again, to enable upturned or downward projection of laser patterns; In the same way as the above adjustment, the housing 1 can be adjusted and fixed on the upside or the backside position to project the laser figure patterns; Of course, when projecting laser patterns on the upside or backside position, the housing 1 can be adjusted either slightly to the front or the rear, or slightly up or down before it is tightened into position.

Figure 8:
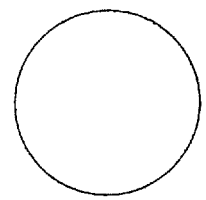
FIG. 8 is the view of various patterns when different rpm's are changed by the subject invention.
Figure 8:
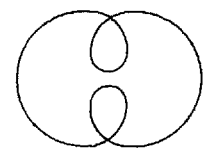
Figure 8:
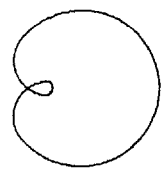
Figure 8:
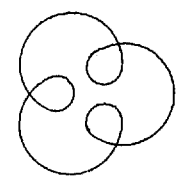
Figure 8:
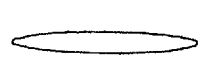
Figure 8:
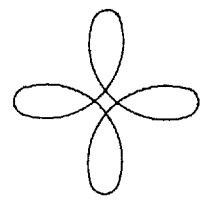
Figure 8:
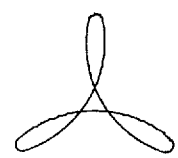
Figure 9:
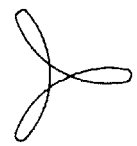
FIG. 9 is the view of various patterns when different reflecting radius ratios are changed by the subject invention.
Figure 9:
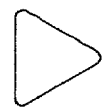
Figure 9:
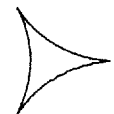
Figure 9:
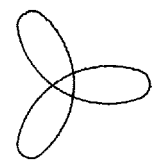
Figure 9:
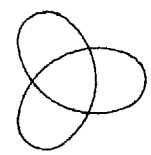
Figure 10:
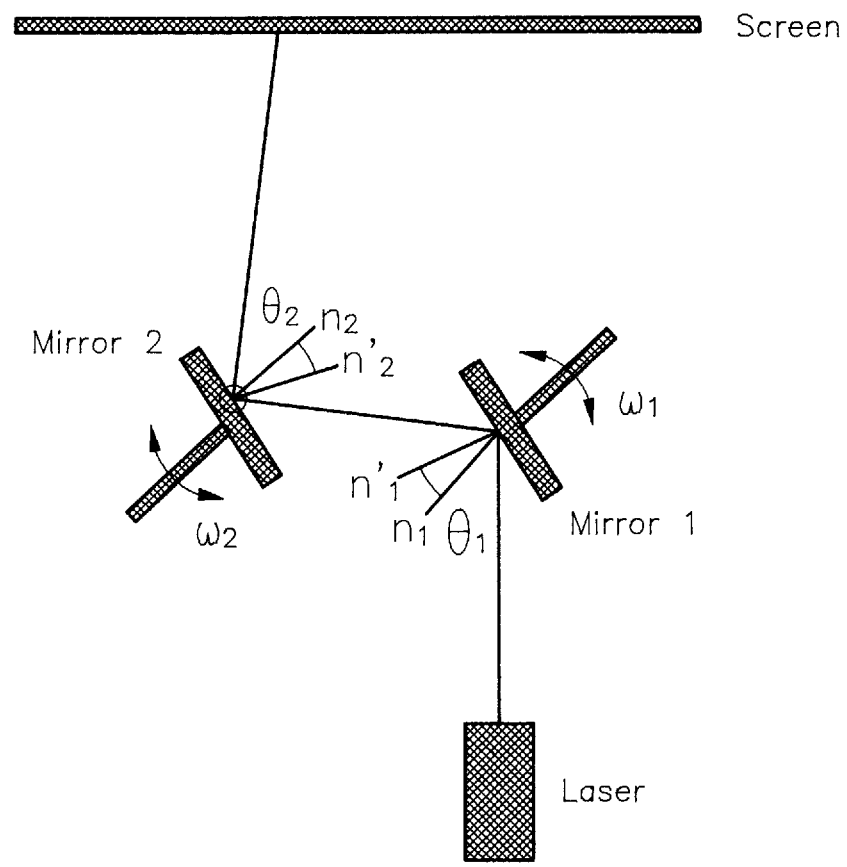
FIG. 10 is the structural view of the subject invention of laser audio-visual equipment utilizing double rotating mirrors.

The above description covers the integral construction and structural installation of the subject invention of "laser patterns displaying unit"; As to how the subject invention will change the "dot" laser rays projected from the laser head 6 into "laser patterns" and what are the patterns, they are explained below with FIGS. 7, 8 and 9:

Referring to FIG. 7, when human eyes see the "dots" of something in "rapid movement", due to the effect of "visual pause", the image seen will be presented with a curve of a specified length. Based on this principle, the laser light "dots" projected from the laser head 6, when they are projected onto a wall 9 or other screens before they are reflected through two or more reflecting turning discs 8a, 8b and 8c, will compose various laser figure patterns composed of several curved lines (as shown in FIG. 8–11). The reason of different variations of laser patterns is mainly because of the different rpm ratio between the first reflecting turning disc 8a and the second reflecting turning disc 8b (since the rpm of the third reflecting disc 8c is synchronous with that of the second reflecting disc 8b); As shown by actual simulation tests, the difference of rpm and reflecting radius between the first and the second reflecting discs 8a and 8b will produce so various laser patterns shown in FIGS. 8 and 9. In other words, when the rpm ratio of the first reflecting disc 8a and the second reflecting disc 8b is preset at 1:1, the pattern (image) projected from the lens 12 of the housing 1 of the subject invention and displayed on the wall 9 or other screens, will be the "circle" figure (image) shown on FIG. 8–11; If it is set at 1:2, a "smaller circle" will appear within the larger circle as shown in 5b. In the same way, if it is set at 1:3 (or 1:-1; 1:-2 and 1:-3), then the images with one or more petals will appear as in FIGS. 8–13, 8–14 and 8–17. Then, if the reflecting radius is changed while the rpm ratios remain as above, then according to simulation test results, the laser patterns can be changed again, as in FIG. 8–17 which shows the figure under the circumstance of rpm ratio at 1:-2 and reflecting radius ratio at 1:1. If said reflecting radius ratios are reduced sequentially (the rpm ratios remain unchanged), then the three-petal figure will gradually reduce and sequentially become as shown in FIGS. 9a through 9e: i.e. laser figures of smaller petals, "arc-sided triangle", equilateral triangle, large and small rings, etc. To make or change said laser figures, or the displayed status or time duration and other operations, we will have to control those components installed at one side of the printed circuit board body 40 (as shown in FIG. 5) by depressing or rotating them: i.e. the mode switch 47b, delay time knob 48a and the first and second manual knobs 48b and 48c; Before operating the above, we have to plug in power source to the power converter socket 46 and turn on the power switch 47a; Meanwhile, besides the above two different control methods to change laser figures, we can also change the direction of rotation (forward or reverse) of respective motors 8a, 8b and 8c in order to change the laser figures; With the laser rays coordinated by the rotating mirrors, the subject invention will scan many varied patterns, based on the theoretical principles as follows:

FIG. 10 shows the laser patterns scanning system of double rotating mirrors, which comprises mainly a laser light source and two sets of rotating mirrors. The two rotating mirrors are so positioned to face each other, while the included angles of the normal vector and the rotating axis are respectively $\theta_1$ and $\theta_2$, and the rotating speeds of the two mirrors are respectively $W_1$ and $W_2$ (rad/s). When the light rays projected from the laser unit are reflected from the two mirrors, they are projected to the screen. In the formulas, $n_1$ and $n_2$ are the directional vector of the axis, $n'_1$ and $n'_2$ are the normal vectors of the screen surface. The light dots projected onto the screen rotate with the two mirrors and present various patterns. The following is the analysis of the mathematical formulas of the pattern.

Figure 11:
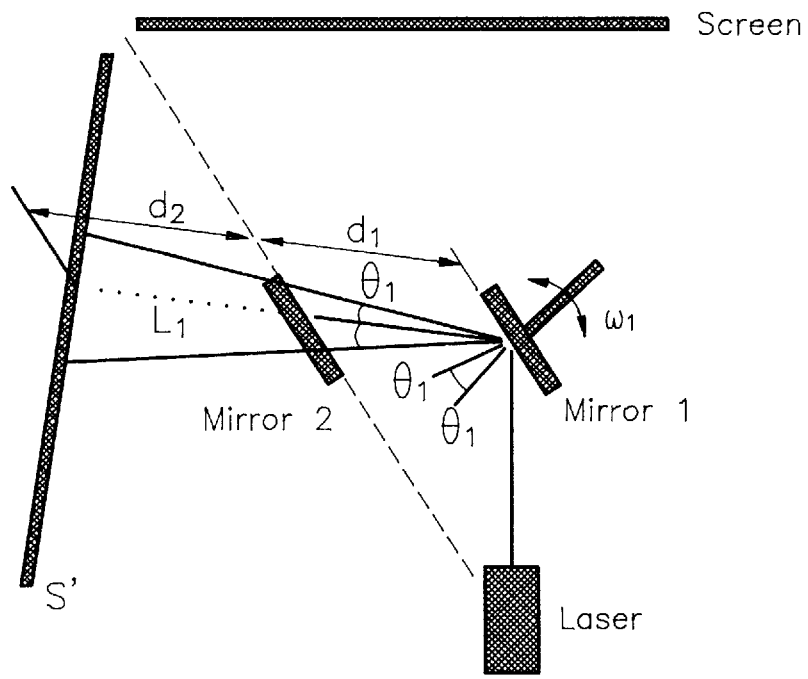
FIG. 11 is the view of patterns produced by mirror 1, as in the double rotating mirror system of FIG. 10.

First, fix the mirror 2 in position and suppose that only the mirror 1 is rotating. Now, project on the screen in the tangential direction of the mirror 2 to obtain virtual-image screen S' (refer to FIG. 11). In FIG. 11, the distance from mirror 1 to mirror 2 is $d_1$, the distance from mirror 2 to virtual screen S' is $d'_2$. If the normal vectors of the light L and the virtual screen S' are parallel, (as a matter of fact, if the two are not parallel, we can make a calculation of the projection according to the included angle of the obtained figure) with the rotation of mirror 1, we can obtain the figure in the virtual screen from the following formulas:

$$x = r_1 \cos(w_1 t)$$

$$y = r_1 \sin(w_1 t)$$

wherein $$r_1 = (d_1 + d'_2) \sin(\theta_1)$$

Above formula is the parameter representation of a circle. And, the pattern on the virtual screen is the pattern presented on the real screen.

Figure 12:
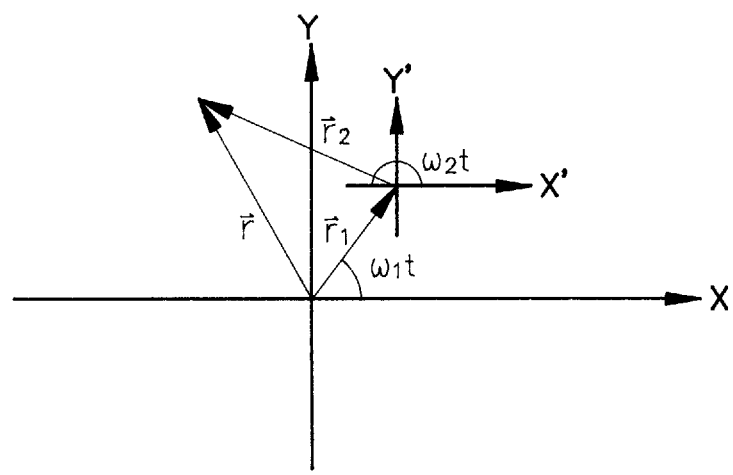
FIG. 12 is the view of composition of vectors, as in the double rotating mirror system of FIG. 10.

Now we will consider the case wherein the mirror 2 rotates simultaneously. In fact, the effect of rotating mirror 2 is to re-project the dots from the illuminated mirror to the screen. Just like moving the local ordinates to the light illuminated mirror 1 and reflected to the screen, then make a round movement, with the same principle described above. Finally, as shown in FIG. 12, the resultant of effects of the two rotating mirrors is the addition of vectors. And the formula of resultant light dot locus is:

$$x = r_1 \cos(w_1 t) + r_2 \cos(w_2 t)$$

$$y = r_1 \sin(w_1 t) + r_2 \sin(w_2 t)$$

wherein $$r_2 = (d_1 + d'_2) \sin(\theta_1)$$

$$r_2 d'_2 \sin(\theta_2)$$

The example of embodiment of the subject invention, with program designs, can control many different variations, including automatic, manual and sound control, to change the output of various laser patterns. The programs are listed below.

---
Annex 1 PASCAL programs
---

```
Program: 2MIRROR.PAS
{$N =}
PROGRAM TWO MIRROR;
{Release 1.0 Date:10/15/96     by Yi-yung}
{- This program is to simulate the 2-mirror system -}
USES
     crt, guaph, printer, Dos;
CONST
     Esc =#27;
VAR
     RPPM1, RPM2, Rad1,Rad2, Time, TimeOld, TimeOld1   :read1;
     X,Y,XOld, YOld, XOld1, YOld1         :  double;
     DeltaRPM, DeltaRad                   ::  real;
     PX,PY,PX1,PY1                        :  integer;
     I,N,M,M1,Length                      :  longint;
     CX,CY, Maxx, Maxy                    :  integer;
     SX,SY,DT                             :  real;
     ch                                   :  char;
     Title, buf                           :  string;
     stopp, soundswitcg                   :  boolean;
     MaxXV, MinXV, MaxYV, MinYV
     MaxVV, MinVV, MaxAW, MaxDist, MaxAl, UsrAL   :  real;
     textH,color                          :  integer;
ROCEDURE Initial_value;
BEGIN
     stop:= false;
     ch:=#0;
     MaxXV:=-le 30; MinXV:= le30;MaxYV = le30;
MinYV:le30:MaxVV:= 0; MinVV:= le30;
     RPM1:= 20.0;
     RPM2:= 0.0;
     Rad1:= 1;
     Rad2:= 0;
     DeltaRPM:= 1;
     DeltaRad:= 0.1;
     SX:= 50;
     DT:= 0.01;
     Length:-300;
     soundswitcg:= true;
END;
{.................. Grape Processing ...................}
PROCEDURE graph init;
VAR
     gd, gm, size, ErrCode :integer;
     Xasp, Yasp: word;
BEGIN
     gd:= detect;
     initgraph(gd, gm,'d:\tp\bgi\');
     ErrCode:= GrahResult'
     if ErrCode<>grOK then begin
        writelb ('Graphics error:',
GrappErrorMsg (errcode)):
               halt;
               end;
          MaxX:= GetMaxX; MaxY;+ GetMaxY;
          CX:= MaxX div 2;
          CY;= MaxY div 2;
          settextstyle (Defaultfont, horizdir, 2);
          settextjustify(centortext, toptext);
       TextH:= TextHeight('H');
       SetFillDtyle (XHatchfill, lightMagenta);
       Bar(0,0,Maxx, TextH*3);
       outtextxy(CX,TextH,'Two Mirrors System');
```

---
Annex 1 PASCAL programs
---

```
       SetFillStyle(CloseDotFill,Brown);
       settextstyle(defaultfont,horizdir,1);
       Bar(0,Maxy-TextH*2,MaxX,MaxY);
       outtextxy(CX,MaxY-TextH-5,'R1+:->R1-:<-R2+:UP
R2-:Dn RPM1+:Hom RPM1-:End RPM2+:PU RPM2-:PD Ins:+L
Del:-L');
       Setcolor(lightGreen);
       rectangle(0,0,Maxx,Maxy);
       rectangle(1,1,Maxx-1,Maxy-1);
       line(0,TextH*3,MaxX,TextH*3);
       line(0,mAXy-tEXTh*2,maxX,MaxY-TextH*2);
       setviewport(3,TextH*3+11,MaxX-3,MaxY-TextH*2-1,true);
       MaxX:=MaxX-6
       MaxY;=Maxy-TextH*3-2;
       CX:=MaxX div 2;
       CY:=Maxy div 2;
       setcolor(Yellow):
       getAspectRatio(Xasp, Yasp);
       SY:=SX*Xasp/Yasp;
END; {graph_init}
PROCEDURE DISPLAT-TITLE:
BEGIN
       setcolor(LightRed);
       str(RPM1:3:1,buf);
       title:='Mirror 1:RPM='+buf;
       str (Rad1:3:1.buf);
       moveto(CX,10);
       outtext(title);
       title:=Mirror 2:RPM='+buf;
       str (Rad2:3:1,buf);
       title:=title+',Radius(outter)='+buf;
       movoto(CX,20);
       outtext(title);
       str(Length:4,buf);
       Litle:='Light Length='+buf;
       moveto(CX,30);
       outtext(title);
END;
Procedure Clear-History;
Begin
       if(N>Length+1)then
       begin
          M:=N-Length;
          M1:=M-1;
          TimeOld:=(M-1)*DT
          TimeO1d:=(M1-1)*DT;
XOld:=Rad1*cos(RPM1*TimeOld)+Rad2*cos(RPM2 ⨉ TimeOld);
XOld:=Rad1*sin(RPM1*TimeOld)+Rad2*sin(RPM2 ⨉ TimeOld);
XOld1:=Rad1*som(RPM1*TimeOld)+Rad2*cos(RPM2 ⨉ TimeOld);
Yold1:=Rad1*sin(RPM1*TimeOld)+Rad2*sin(RPM2 ⨉ TimeOld);
          PX=CX+round(Xold*SY);
          PX=CY-round(yoLD*SY);
          PX1=CX+round(xoLD1*SX);
          PY1=CY-round(YOld1*SY);
          setcolor(black);
          line(PX,PY,PPX1,PY1;
     end;
 end
{***********main program*******************}
BEGIN
     N:=0;
     repeat
       Initial_value;
       grappn_init;
       Display_Title;
          repeat       {until ch=ESC}
             if keypressed then
             begin
                ch:=readkey
                if keypressed then
                begin
                   ch:=readkey;
                   case ch of
                       #71: RPM1:=RPM1+Delta RPM;
                       #79: RPM1:=RPM1+Delta RPM;
                       #73: RPM2:=RPM2+Delta RPM;
                       #81: RPM2:=RPM2+Delta RPM;
                       #77: RPM1:=RPM1+Delta RPM;
```

-continued

Annex 1 PASCAL programs

```
            #75: RPM1:=RPM1+Delta RPM;
            #72: RPM2:=RPM2+Delta RPM;
            #80: RPM2:=RPM2+Delta RPM;
            #82: Length:=Lengyt+100;
            #83: Length:=Lengyt-100;
            #59: SoundSwitch:=not SoundSwitch:
       end; {end of case}
       if  Length<=0 then Length:0;
       if  Rad1<0 then Rad1:=0;
       if  Rad2<0 then Ead2:=0;
       if  (ch=#71) or (ch=#79) or (ch=#73) or
  (ch=#81)or
            (ch=#77) or (ch=#75) or(ch=#72) or
  (ch=#80) or
            (ch=#82) or (ch=#83) then
       begin
            clearviewport;
            N:=0;
            DT:1/(ads(RPM1)+ads(RPM2)+1*0.1;
            Display_Title;
       end;
     end; {end ofkeypressed}
     N:=N+1;
     if N<0 then *DT;
     X:=Rad1*cos(RPM1*Time)+Rad2*cos(RPM2*Time);
     Y:=Rad1*sin(RPM1*Time)+Rad2*cos(RPM2*Time);
     PX:=CX+round(X * SX);
     PY:=CY-round(Y*SY);
     setcolor (Yellow);
     if N=1 then Moveto (PX,PY) else Lineto(PX,PY);
     if soundswitch then
  sound (round{abs(X+Y)+1 ) ) }*50+round (In (abs
  (RPM1+RPM2)+1))*10)
     else
            nosound;
            Clear_History;
       until ch=Esc;
     restoreCRTmode;
     repeat if keypressed then ch:=readkey until not
  keypressed;
       if(ch='n') or (ch='N') or (ch=Esc) then
  stop:=true;
       until Stop;.
       nosound;
     END.
```

Summing up, the features of the subject invention include the follows: additional fall-image plate 26 in the two-shaft motor rotating mirror reflection system, the fall-image plates 26 can be a combination of more than one pieces, with the diffraction grating on the fall-image plate 26 to convert the light rays to diffracted light, thus increasing the variations of scanned patterns 25 and patterns 25*a* through 25*d*. On the other hand, the subject invention includes the balancing device 30 on the first rotating motor 22*a* or the second rotating motor 22*b*, with the shortening or stretching of springs 31*a* and 31*b* to change the inclining angles of the reflecting mirror 21*a* and the reflecting mirror 21*b*, and further increase the complexity and variation of scanned pattern 25 and patterns 25*a* to 25*b*, to produce the effects of many varied laser patterns.

It is declared herewith that the above description of the preferred embodiment of the subject invention shall not be based to restrict or limit the subject invention, and that anyone familiar with this trade will be able to make conceivable changes and modifications deriving from the intent and scope of the subject invention, and so the scope of protection of the subject invention should include those specified in the following claims.

I claim:

1. A laser audio-visual unit, comprising a laser pattern displaying device having a full-image spectral device disposed therein, said laser pattern display device further including a housing, a lens disposed in a window formed through said housing, a fixed plate disposed within said housing for supporting said full-image spectral device, a fixed rack disposed within said housing for supporting said fixed plate, and a mounting stand adjustably coupled to said housing, said full-image spectral device including:

a light source disposed in said housing to provide light rays;

a circuit board disposed in said housing;

a first reflecting mirror coupled to a first rotating motor for continuous rotation of said first reflecting mirror, said first reflecting mirror reflecting said light rays from said light source;

a first biasing element coupled between said first reflecting mirror and said first rotating motor for applying a bias force to said first reflecting mirror for providing an angular displacement thereof responsive to a change in a rotational speed of said first rotating motor;

a first control circuit disposed on said circuit board and electrically coupled to said first rotating motor for controlling said rotational speed of said first rotating motor;

a second reflecting mirror coupled to a second rotating motor for continuous rotation of said second reflecting mirror, said second reflecting mirror reflecting said light rays reflected from said first reflecting mirror;

a second biasing element coupled between said second reflecting mirror and said second rotating motor for applying a bias force to said second reflecting mirror for providing an angular displacement thereof responsive to a change in a rotational speed of said second rotating motor;

a second control circuit disposed on said circuit board and electrically coupled to said second rotating motor for controlling said rotational speed of said second rotating motor; and, a full-image plate located between said second reflecting mirror and said lens to diffract said light rays reflected from said second reflecting mirror; and, a mode control circuit disposed on said circuit board for controlling an operating mode of said full-image spectral device, said mode control circuit enabling selective operation in one of a manual mode, an automatic mode, and a sound control mode.

2. The laser audio-visual unit as recited in claim 1 where said first and second biasing elements are springs.

3. The laser audio-visual unit as recited in claim 1 where said full-image spectral device further includes a third reflecting mirror coupled to a third rotating motor for continuous rotation of said third reflecting mirror, said third reflecting mirror being disposed between said second reflecting mirror and said lens for reflecting said reflected light rays from said second reflecting mirror.

4. The laser audio-visual unit as recited in claim 3 where said third rotating motor is operated in synchronism with said second rotating motor.

5. The laser audio-visual unit as recited in claim 3 where said full-image spectral device further includes a third biasing element coupled between said third reflecting mirror and said third rotating motor for applying a bias force to said third reflecting mirror for providing an angular displacement thereof responsive to a change in a rotational speed of said third rotating motor.

* * * * *